United States Patent [19]
Iida

[11] Patent Number: 5,422,727
[45] Date of Patent: Jun. 6, 1995

[54] FACSIMILE APPARATUS HAVING MAGNETIC TAPE RECORDING APPARATUS FOR DATA STORAGE

[75] Inventor: Kouichi Iida, Fukuoka, Japan

[73] Assignee: Matsushita Electric Industrial Co., Ltd., Osaka, Japan

[21] Appl. No.: 951,953

[22] Filed: Sep. 28, 1992

[30] Foreign Application Priority Data

Sep. 27, 1991 [JP] Japan .................... 3-248995

[51] Int. Cl.[6] ..................... H04N 1/21; H04N 1/23
[52] U.S. Cl. ..................... 358/296; 358/261.4
[58] Field of Search ............... 358/296, 261.4; 360/134

[56] References Cited

U.S. PATENT DOCUMENTS

| | | | |
|---|---|---|---|
| 3,736,568 | 5/1973 | Snook | 340/172.5 |
| 3,914,539 | 10/1975 | Hashimoto | 178/6 |
| 4,139,869 | 3/1979 | Holt | 360/35 |
| 4,297,727 | 10/1981 | Ogawa et al. | 358/261 |
| 5,293,280 | 3/1994 | Ishikawa et al. | 360/74.1 |

*Primary Examiner*—Bernard Roskoski
*Attorney, Agent, or Firm*—Lowe, Price, LeBlanc & Becker

[57] ABSTRACT

In a facsimile apparatus having a magnetic tape recording apparatus for data storage and a buffer memory for data transfer to and from the recording apparatus, with the data being temporarily held in the buffer memory as respective blocks in a set of records, a synchronizing signal is inserted at the start of each recorded block of data, and the synchronizing signals are detected subsequently during playback of the recorded data. During playback, a buffer memory address generating circuit which specifies respective records and intra-record addresses for writing the playback data into the buffer memory, is reset to either the initial address of the current record or the initial address of the succeeding record each time a synchronizing signal is detected, in accordance with the position where the detection occurs within the addresses of the current record. The effects of an error in the playback data can thereby be limited to the data block in which the error occurs, without propogating to subsequent blocks.

13 Claims, 8 Drawing Sheets

FACSIMILE APPARATUS HAVING MAGNETIC TAPE RECORDING APPARATUS FOR DATA STORAGE

BACKGROUND OF THE INVENTION

1. Field of the Invention

The present invention relates to a facsimile apparatus which incorporates a magnetic tape recording and playback apparatus (referred to in the following simply as a magnetic tape recording apparatus) for storing digital data.

2. Description of the Related Art

A type of facsimile apparatus is known in the prior art which includes a magnetic tape recording apparatus, used to store digital image data, e.g. data which have been received via a telephone system and are to be subsequently supplied to a printer or other device. The basic concepts of Using a magnetic tape recording apparatus in a facsimile apparatus will be described referring to FIGS. 1 and 2. In FIG. 1, 30 denotes a magnetic tape of the magnetic tape recording apparatus, 31 denotes a magnetic recording/playback head, 32 denotes a playback circuit which converts a playback signal produced from the recording/playback head 31 into digital data, and 33 denotes a buffer memory which functions as an input buffer for data that are to be recorded on the magnetic tape 30 and also for data that are read out from the tape during playback (e.g. data that are to be transferred to a printer). It is assumed that the buffer memory 33 address space is divided into a plurality of sections of identical size (referred to in the following as records) for storing respective blocks of data of identical size. Data blocks A, B, and C recorded on the magnetic tape 30 are to be sequentially stored in respective records in the buffer memory 33. The tape motion direction is indicated by the arrow, and FIG. 1 shows the condition during playback operation, immediately before the data block A begins to be read from the magnetic tape 30. FIG. 2 shows the condition immediately following completion of reading the data block C from the magnetic tape 30. The data blocks A, B and C recorded on the magnetic tape have now been stored in the buffer memory 33 in respective sequential records which are numbered 0, 1, 2.

However such a type of digital magnetic tape recording apparatus has certain basic disadvantages by comparison with other types of storage device which can be used in a facsimile apparatus, such as a magnetic disk apparatus or a semiconductor memory. These disadvantages include a tendency for errors to arise due to the effects of dust particles on the head 31, the effects of temperature changes, electrical noise interference, etc. As a result, a higher rate of data errors occurs with such a digital magnetic tape recording apparatus by comparison with the other types of data storage apparatus.

Furthermore, the playback signal that is obtained from such a digital magnetic tape recording apparatus exhibits relatively large fluctuations in amplitude and time-axis variation components. Hence, once a data error has entered the playback data, it is difficult to execute processing for recovery from the error.

There are two basic types of error which can arise in the playback data. Firstly, due to the effects of dust particles on the recording/playback head for example, data drop out may occur, whereby a number of successive bits are lost from the playback data. Secondly, a number of successive spurious bits may be inserted into the playback data, for example due to the effects of electrical noise during the recording or playback process. FIG. 3 is a diagram to illustrate the effects of the latter type of error. It is assumed that erroneous bits have been inserted into the data recorded on the tape, e.g. due to noise, at the position on the tape indicated by numeral 29, within the data block B. As a result, the erroneous data are read out from the tape and stored in the section of the buffer memory 33 that has been predetermined for the record B, with the error data indicated by the hatched-line portion. However due to that error data being inserted in the playback data stream, the length of the data block B will be extended beyond its predetermined length (i.e. predetermined number of data periods). Hence as illustrated, the data block B will overlap into the buffer memory section that has been predetermined for storing the next record C. Thus the effects of the single error 29 will be successively propogated throughout the data records that are subsequently stored in the buffer memory 33, i.e. each of these records will not begin with the correct datum from the recorded data.

Assuming that the data consist of successive bytes representing respective picture elements of an image or a text page, then when the data shown in FIG. 3 are read out from the buffer memory and supplied as a data stream to a printer, the data from each of the records 2, 3, . . . will be incorrectly positioned along that data stream in relation to the data from record 0, so that the resultant printed image or text will be significantly distorted. That is to say, an entire picture portion which is generated from the data read from the remaining records 2, 3, . . . will be incorrectly displayed in relation to the picture portion which is generated from the data read from the record 0.

In general, data management information is recorded on the magnetic tape 30 together with the data, to define the respective start and end positions of each of the data A, B, C, . . . , for use in correctly storing these data in predetermined sections of the buffer memory 33 after read out from the magnetic tape. However such management information assumes that the respective data blocks A, B, C begin and end at specific predetermined positions along the tape. Thus the effects of an error such as that shown in FIG. 3 make it impossible to correctly apply such data management information to the playback data.

It will be understood that similar problems will arise when data are occasionally lost from the playback signal due to drop out, so that for example the data block B in the playback data might be made shorter than the predetermined length. In such a case too, the effects of the error will propogate into subsequent data records stored in the buffer memory 33.

It can be seen that such problems arise from the fact that due to such an error, the start and end points of each of the data blocks that are recovered from the magnetic tape to be stored as respective records and which occur subsequent to the error location, are no longer correctly defined.

SUMMARY OF THE INVENTION

It is an objective of the present invention to overcome the problems of the prior art set out above, by providing a facsimile apparatus including a magnetic tape recording apparatus whereby the effects of errors of the form described above which may arise in the playback image data from the magnetic tape recording apparatus can be substantially eliminated, to the extent that such errors will have a negligible effect upon images or text that are printed or displayed by using the playback data.

To achieve the above objectives, image data to be recorded by the magnetic tape recording apparatus are converted to a recording signal, and synchronization signals are periodically inserted into the recording signal, which is then recorded on magnetic tape. The synchronization signals are generated with a fixed period, so that each synchronization signal in the recorded data is followed by a fixed-length data block. At the time of playback, the recovered data blocks are written into respective fixed-length sets of addresses (i.e. records) of the buffer memory, using address values generated by an address generating circuit which specify the buffer memory record into which each data block is to written and the address within each record into which each sub-unit (e.g. byte) of a block is to be written. Means are provided which function during playback to detect and separating the synchronization signals from the playback data stream, to be supplied to the address generating circuit. Each time a synchronization signal is detected, the address generating circuit is reset to a condition in which it specifies the start of a record. The data block following each synchronization signal in the playback data stream is thereby written into that record, beginning from the head of the record. As a result, the effects (upon relative position relationships between data stored in the buffer memory after playback) of any loss of data from within a block, or presence of additional spurious data within a block, in the playback data, will be limited to the block in which the error occurs, and will not propogate to succeeding blocks.

According to a first aspect the present invention provides, in a facsimile apparatus, digital data storage means comprising:

a buffer memory;

a magnetic tape recording apparatus;

a control circuit operable for selectively setting the magnetic tape recording apparatus in a recording mode of operation for recording image data and in a playback mode of operation for playback of the data;

recording means functioning in the recording mode to convert the data to a recording signal and for recording the data, as the recording signal, on a magnetic tape;

synchronization signal generating and insertion means for periodically inserting synchronization signals into the data recorded on the magnetic tape, at respective positions between successive fixed-length data blocks;

playback means functioning in the playback mode to recover the data blocks from the magnetic tape, and to detect the synchronization signals; and address generating means functioning in the playback mode to generate addresses for storing the data blocks from the playback means in respective sequential records of the buffer memory, the address generating means being responsive to detection of each of the synchronization signals for being reset to generate an initial address of one of the records.

With such a facsimile apparatus, the recording signal is a modulated signal derived from the data and the synchronization signal generating and insertion means may function to periodically insert the synchronization signals into the recording signal.

According to another aspect, the address generating means can be configured to be reset to generate an initial address of a current one of the records if one of the synchronization signals is detected during generation of addresses within an initial half of the current record, and is reset to generate an initial address of a succeeding one of the records if the synchronization signal is detected during generation of addresses within a second half of the current record.

According to a third aspect, the playback means comprises means for generating a recovered clock signal which is synchronized with the data recovered by the playback means, an the address generating means comprises a low order address counter functioning in the playback mode to count in synchronism with the recovered clock signal, for producing count values specifying successive address positions within each of the records, and a high order address counter coupled to be periodically incremented by an output signal from the low order address counter, for producing count values specifying successive ones of the records.

The low order address counter is preferably configured to have a total number of count states which is greater by one than a number of addresses in each of the records, and t Re low order address counter may include means for recoding one of the count states during the recording mode, to produce a designation signal for control ling the synchronization signal generation and insertion means to periodically insert the synchronization signals into the recording signal.

DESCRIPTION PREFERRED EMBODIMENTS

Figure 4:
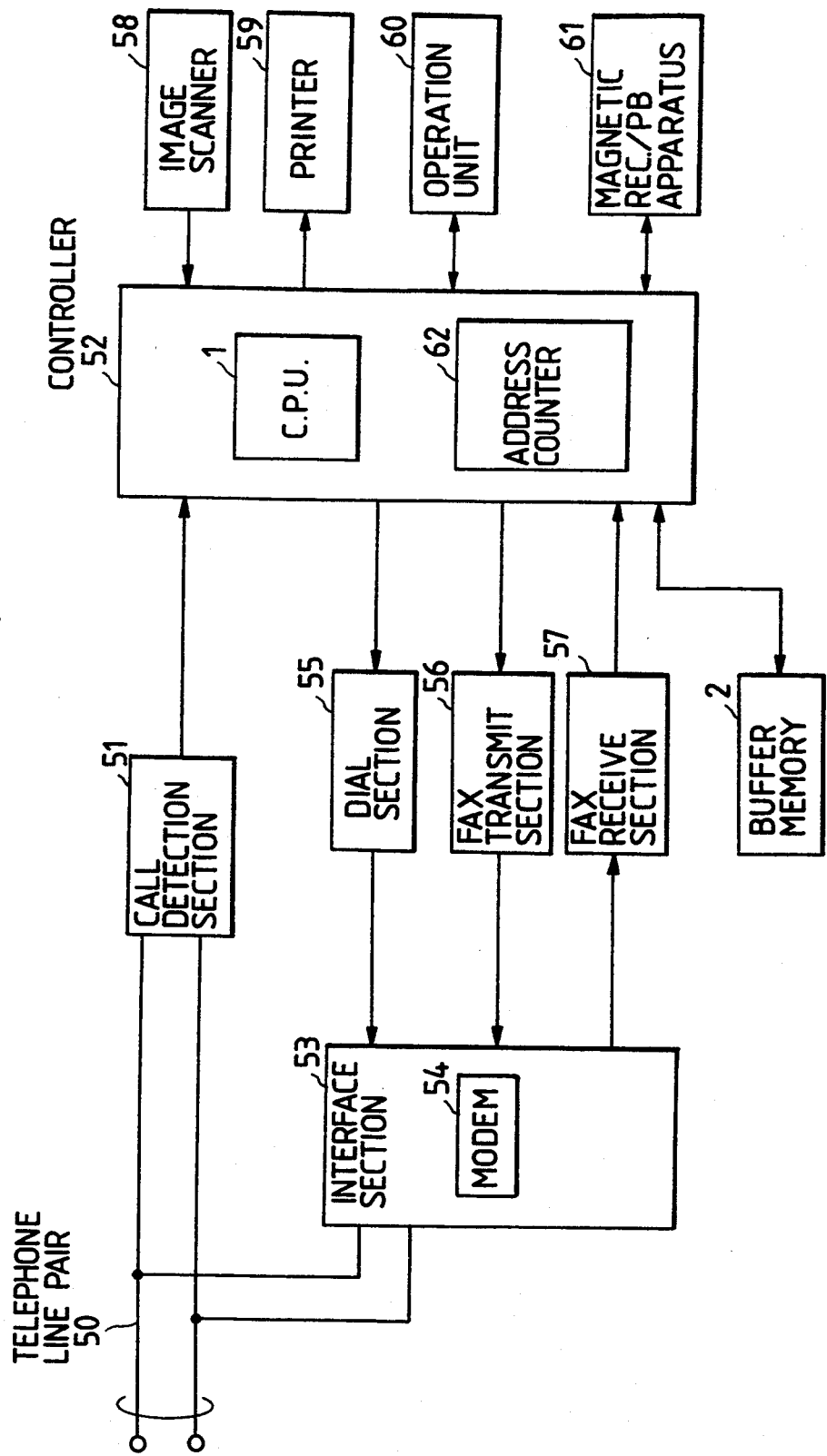
FIG. 4 is a general block diagram of an embodiment of a facsimile apparatus according to the present invention which includes a magnetic tape recording apparatus.

FIG. 4 is a general block diagram of an embodiment of a facsimile apparatus having a magnetic tape recording apparatus according to the present invention. The facsimile apparatus includes a controller 52 which controls the overall operations of the facsimile apparatus, a buffer memory 2 and a magnetic tape recording apparatus 61, The controller 52 is based on a programed microcomputer which is designated as the CPU 1, and further includes an address counter 62 which is used to generate a addresses of a buffer memory 2 only during recording and playback operations of the magnetic tape recording apparatus 61. The apparatus further includes an interface section 53, a call detection section 51, a dial section 55, fax transmit section 56, fax receive section 57, image scanner 58, printer 59, and operation unit 60. A line pair 50 of a public telephone system is connected to the call detection section 51 and also to the interface section 53. The call detection section 51 detects when the facsimile apparatus is being called from a distant facsimile apparatus. The dial section 55 is controlled by the controller 52 to generate a dialing signal when the facsimile apparatus is to transfer data to a distant facsimile apparatus. The fax transmit section, coupled between the controller 53 and the controller 52, serves to convert standard binary data produced from the controller 52 into the requisite format for facsimile transmission, and the resultant signal is supplied to a modem within the interface section 53, to be supplied as a modulated signal to the line pair 50. Conversely, the fax receive section serves to convert received facsimile format data into a standard binary code form, to be supplied to the controller 52. Data to be transmitted are generated by the image scanner 58. Received data are printed out by the printer 59. Received data may be first transferred through the buffer memory 2 to be recorded on magnetic tape by the magnetic tape recording apparatus 61, and subsequently played back and transferred via the buffer memory 2 to the printer 59 at an appropriate time.

Figure 5:
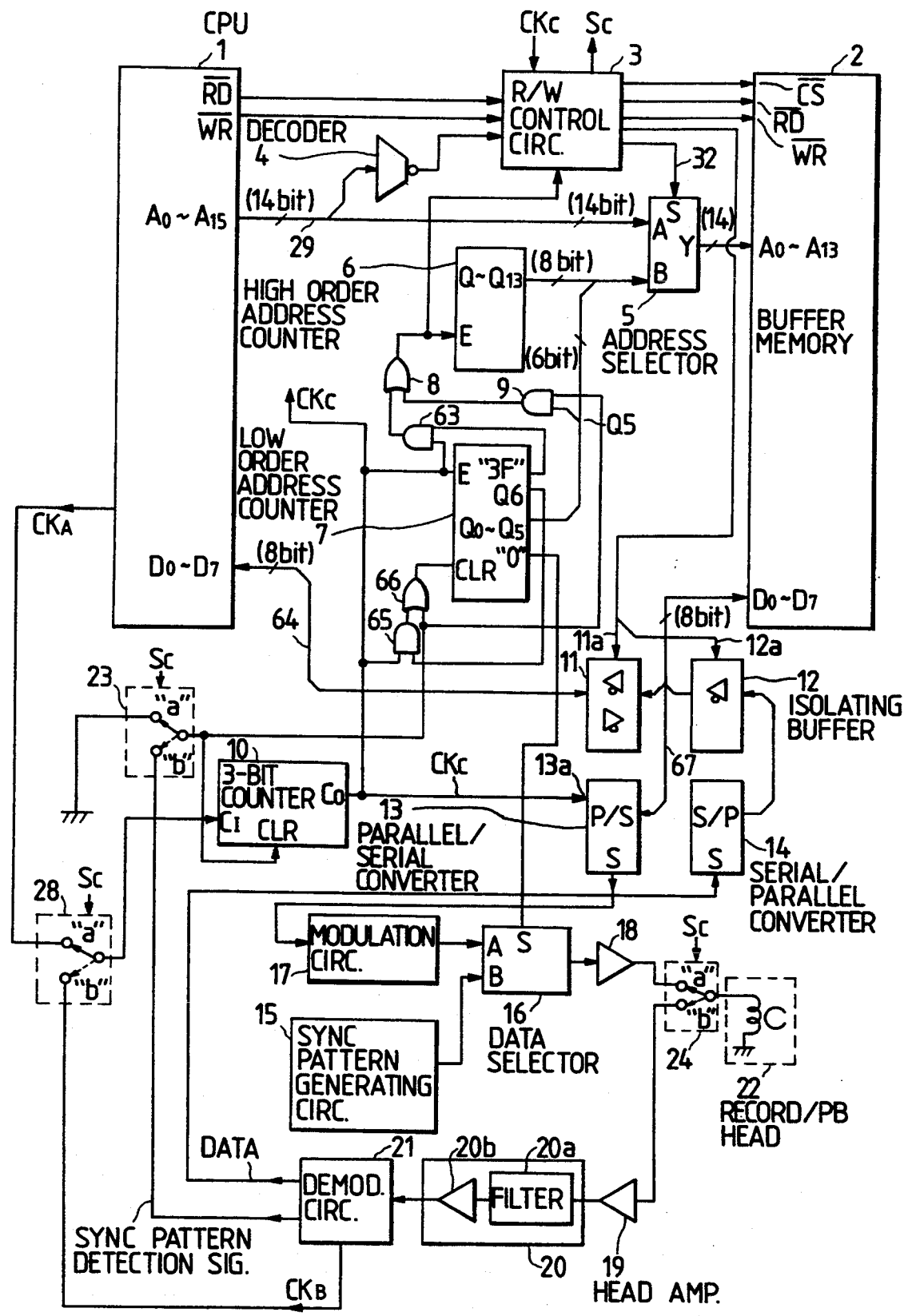
FIG. 5 is a partial block diagram of the facsimile apparatus of FIG. 4, showing circuit details of the magnetic tape recording apparatus and of an address counter circuit which generates buffer memory addresses during recording and playback operation of the magnetic tape recording apparatus.

FIG. 5 is a partial detailed block diagram of the facsimile apparatus of FIG. 4, showing internal circuit blocks of the controller 52 and the magnetic tape recording apparatus 61. In FIG. 5, a high order address counter 6 and low order address counter 7 constitute, in combination, the address counter 62 of FIG. 4. A read/-write control circuit 3, an address decoder 4, an address selector 5, isolating buffers 11, 12, a 3-bit counter 10, a parallel/serial converter 13 and a serial/parallel converter 14 are contained within the controller 52. A synchronization pattern generating circuit 15 and a data selector 16 function to periodically insert a synchronization signal into a recording signal. A modulation circuit 17, read circuit 20, and a demodulation circuit 21 are used in the recording and playback process, and constitute components of the magnetic tape recording apparatus 61, together with a recording/playback head 22 and also mechanical components for transporting a magnetic tape, etc. (not shown in the drawings). The apparatus also includes a recording current amplifier 18, and a head amplifier 19 which amplifies the playback signal produced from the recording/playback head 22 during playback operation. The modulation circuit 17 serves to convert the serial binary data that are supplied from the parallel/serial converter 13 during magnetic tape recording operation into FM form, as described hereinafter. The parallel/serial converter 13 has an internal latch circuit, controlled by a clock signal supplied to an input terminal 13a, whereby a delay of one clock period is introduced between the time of generation of a buffer memory address for read-out and transfer of a parallel 8-bit byte to the parallel/serial converter 13 and the time at which the first bit of the resultant serial data is outputted from serial output terminal (S) of the parallel/serial converter 13. The synchronization pattern generating circuit 15 repetitively generates a synchronization pattern during each of successive byte (8-bit) periods of the data being recorded, and these synchronization pattern bytes are inserted periodically into the recording signal by the data selector 16, with the selected output signal from the data selector 16 being amplified by the recording current amplifier 18 and supplied to the recording/playback head 22 via a changeover switch circuit 24. During playback operation, the amplified playback signal from the amplifier 19 is supplied to the read circuit 20 formed of a filter 20a and comparator 20b, which recovers the original FM recording signal from the playback signal. The FM output signal from the read circuit 20 is supplied to the demodulation circuit 21, which demodulates that signal to recover the originally recorded digital data as successive bits, and also recovers the clock signal component of that data stream and generates a corresponding clock signal designated as $CK_B$. In addition, the demodulation circuit 21 included a circuit for detecting each occurrence of a syhchronization pattern in the playback data, and produces a synchronization pattern detection signal which goes to the H logic level in each of the intervals in which the synchronization pattern occurs.

In this embodiment, each record of the buffer memory 2 consists of 64 addresses, for storing 64 data bytes respectively. The address decoder 4 receives 14-bit address values from the address bus of the CPU 1, and produces output control signals which are supplied to the read/write control circuit 3. Read and write control signals for the buffer memory 2 are also supplied from the CPU 1 to the read/write control circuit 3. The aforementioned address counter 62 is formed of a high order address counter 6 which is an 8 bit binary counter and produces the 8high order bits of an address signal, and a low order address counter 7 which is a 7 bit binary counter with only the 6 low order bit outputs (designated as Q0 to Q5) being used as the 6 low order address bits of an address signal. Thus a total of 14 address bits are produced from the counters 6, 7, with the 8 high order bits of an address signal specifying a record in the buffer memory (i.e. numbered sequentially as 0, 1, 2, .. . 255 respectively), and the 6 low order bits specifying respective addresses (i.e. from 0 to 63) within the record which is specified by the 8 high order bits.

The address counters 6, 7 are utilized only when data are being recorded by or read out from the magnetic tape recording apparatus. At any other time, the CPU 1 directly accesses the buffer memory 2, i.e. address signals from the CPU 1 are supplied via the address selector 5 to the address bus of the buffer memory 2, and read and write control signals from the CPU 1 are transferred to the buffer memory 2 via the read/write control circuit 3.

Control of accessing the buffer memory 2 is based upon the address signals from the CPU 1. Specifically, two predetermined address values are assigned for control purposes. When a first of these predetermined address values is produced on the address bus 29 of the CPU 1, and is decoded by the address decoder 4, the address decoder 4 supplies a control signal to the read/write control circuit 3 whereby the read/write control circuit 3 generates control signals for setting the system in a condition in which the buffer memory 2 is accessed by address signals from the high order address counter 6 and low order address counter 7, the magnetic tape recording apparatus is set in recording operation, and in which data are successively read out from the buffer memory 2 and recorded on magnetic tape by the magnetic tape recording apparatus. In the following, that condition of the system will be referred to as the recording access mode.

When a second one of the aforementioned two address values is generated on the address bus of the CPU 1, the address decoder 4 supplies a control signal to the read/write control circuit 3 whereby the read/write control circuit 3 generates control signals for setting the system in a condition in which the buffer memory 2 is accessed by address signals from the high order address counter 6 and low order address counter 7, the magnetic tape recording apparatus is set in playback operation, and in Which recorded data are played back from the magnetic tape and successively written into the buffer memory 2. That form of operation of the system will be referred to as the playback access mode.

When any address other than the aforementioned two addresses is generated by the CPU 1, control signals are produced from the read/write control circuit 3 whereby the CPU 1 accesses the buffer memory 2, and data can be transferred between the data buses of the CPU 1 and buffer memory 2. That form of operation will be referred to as the CPU access mode.

In both the playback access mode and recording access mode, the read/write control circuit 3 supplies a control signal on line 32 to the address selector 5 whereby the address selector 5 transfers the 14-bit address signals from the pair of address counters 6, 7 to the address bus of the buffer memory 2, and in addition supplies control signals on lines 11a, 12a whereby the isolating buffer 12 is set in the enabled condition, and the bidirectional isolating buffer 11 is set in the isolating condition, so that data cannot be transferred from the data bus 64 of the CPU 1 to the address bus of the buffer memory 2.

In the CPU access mode, the read/write control circuit 3 supplies a control signal on line 32 to the address selector 5 whereby the address selector 5 transfers the 14-bit address signals from the CPU 1 to the address bus of the buffer memory 2, and in addition supplies control signals on lines 11a, 12a whereby the isolating buffer 12 is set in the isolating condition, and the bidirectional isolating buffer 11 is set in the enabled condition, so that data can be transferred from the data bus 64 of the CPU 1 to the data bus 67 of the buffer memory 2.

The parallel/serial converter 13 is connected between the data bus 67 of the buffer memory 2 and the modulation circuit 17, and receives the output clock signal from the 3-bit counter 10 as a latch signal, to convert (after a 1 byte period delay, as described above) into serial form successive parallel 8-bit data bytes that are read out from the buffer memory 2, for recording by the magnetic tape recording apparatus. The isolating buffer 12 is connected between the data output from the demodulation circuit 21 and (via the serial/parallel converter 14) the data bus 67 of the buffer memory 2, and converts the recovered serial data produced from the demodulation circuit 21 into successive 8-bit parallel bytes, to be stored in the buffer memory 2.

Three changeover switch circuits 23, 24 and 28 are each set to the "a" selection position by a control signal $S_C$ from the read/write control circuit 3 during operation in the recording access mode, and are each set to the "b" selection position by control signal $S_C$ during operation in the playback access mode. As a result, during operation in the recording access mode, the "clear" input of the 3-bit counter 10 is held at ground potential (i.e. the L logic level), the output from the recording current amplifier 18 is supplied to the recording/playpack head 22, and a fixed-frequency clock signal $CK_A$ produced from the CPU 1 is supplied to the 3-bit counter 10 to be counted.

The output clock signal $CK_C$ produced from the 3-bit counter 10 is synchronized with the successive data bytes that are read out from the buffer memory 2 to be recorded in the recording access mode, and with the playback data bytes that are outputted from the serial/parallel converter 14 during operation in the playback access made. That clock signal $CK_C$ is also supplied to the read/write control circuit 3, for use in appropriately synchronizing (with the address signals produced from the address counter pair 6, 7) read control signals ($\overline{RD}$) that are supplied to the buffer memory 2 from the read/write control circuit 3 in the recording access mode, and write control signals ($\overline{WR}$) that are supplied to the buffer memory 2 from the read/write control circuit 3 in the playback access mode.

Each of the counters 6 and 7 functions to, in effect, count successive pulses applied to the "count enable" (E) terminal thereof. Specifically, the count state is incremented when the signal applied to the "count enable" terminal falls from the H to the L level.

Since the Q6 output of the low order address counter 7 is fed back to the "clear" input terminal of that counter, via the AND gate 65 and OR gate 66, the low order address counter 7 functions as a factor 65 counter. That is, there is a total of 65 count states, since when a count of 64 is reached the counter is reset to a count of 0 in the next period of $CK_C$. Thus it becomes possible to use 64 of the count states for respective address values within each record, and one count state for the synchronization pattern byte. An output designated as "3F" (signifying the hexadecimal system value of decimal 63) is produced by an internal decoder of the counter 7 (not shown in the drawing), and goes to the H logic level when the counter 7 attains the count of 63, i.e. when all of the outputs Q0 to Q5 are at the H logic level and Q6 at the L level. That "3F" output is supplied through the AND gate 63 and OR gate 8 to the count enable input of the high order address counter 6, so that the count in the high order address counter 6 is incremented each time the "3F" output goes from the H to the L level, i.e. immediately before the counter low order address counter 7 reaches a count of 64.

The Q5 output from the low order address counter 7 (which goes to the H logic level when a count of 32 is reached, and remains at that level until the count reaches 9) is supplied to one input of the AND gate 64, whose output is coupled via the OR gate 8 to the "count enable" input of the high order address counter 6, while the synchronization pattern detection signal from the demodulation circuit 21 is supplied to the other input of the AND gate 9. An internal decoder of the counter 7 (not shown in the drawing) produces an output at the H logic level when the counter attains a count of zero, i.e. when all of the outputs Q0 to Q6 are at the L logic level. That decoded count output, designated as the "0" output from the low order address counter 7, is used to insert a synchronization signal during recording operation, as described hereinafter.

The operator of the circuit of FIG. 5 is as follows, beginning with operation in the CPU access mode. Image data that are be recorded on the magnetic tape are supplied to the data bus 64 of the CPU 1 as successive parallel 8-bit bytes, and the data are transferred to the data bus of the buffer memory 2 and written into the buffer memory 2. During that operation, address values and write control signals ($\overline{WR}$) are supplied from the CPU 1 to the buffer memory 2, respectively transferred through the address selector 5 and the read/write control circuit 3, such that the data are written into successive records in the buffer memory 2. It will be ass med that the first of these records is specified by an "all zero" state of the 8 high order bits of the address signal supplied to the buffer memory 2, and that up to 255 records can be written.

The system is then set in the aforementioned recording access mode. Firstly, control signals (omitted from FIG. 5, for simplicity of description) are generated by the read/write control circuit 3, for setting the mechanical components of the magnetic tape recording apparatus into the recording condition, with the magnetic tape set in motion, while in addition a changeover control signal $S_C$ produced from the read/write control circuit 3 sets each of the changeover switch circuits 23, 24, 28 to the "a" selection position thereof. Read control signals are then generated by the read/write control circuit 3 and supplied to the buffer memory 2, and corresponding address values are sequentially generated by the high order address counter 6 and low order address counter 7, and transferred through selector 5 to the buffer memory 2, while the data bus of the CPU 1 is isolated from the data bus of the buffer memory 2. The stored data in the buffer memory 2 are thereby successively read out, converted from parallel bytes to serial data by the parallel/serial converter 13, and supplied to the modulation circuit 17 to be recorded on the magnetic tape. In this mode, the fixed-frequency bit-synchronized clock signal $CK_A$ is counted by the 3-bit counter 10 to produce the byte-synchronized clock signal $CK_C$, which is counted by the low order address counter 7. During each period of $CK_C$ in which a count of zero is reached by the low order address counter 7, the data selector 16 inserts a synchronization pattern byte of the form shown in FIG. 6 (described hereinafter) into the data stream. Each of these synchronization pattern bytes in the recording data stream is followed by 64 bytes of data read out from the buffer memory 2.

Figure 6:
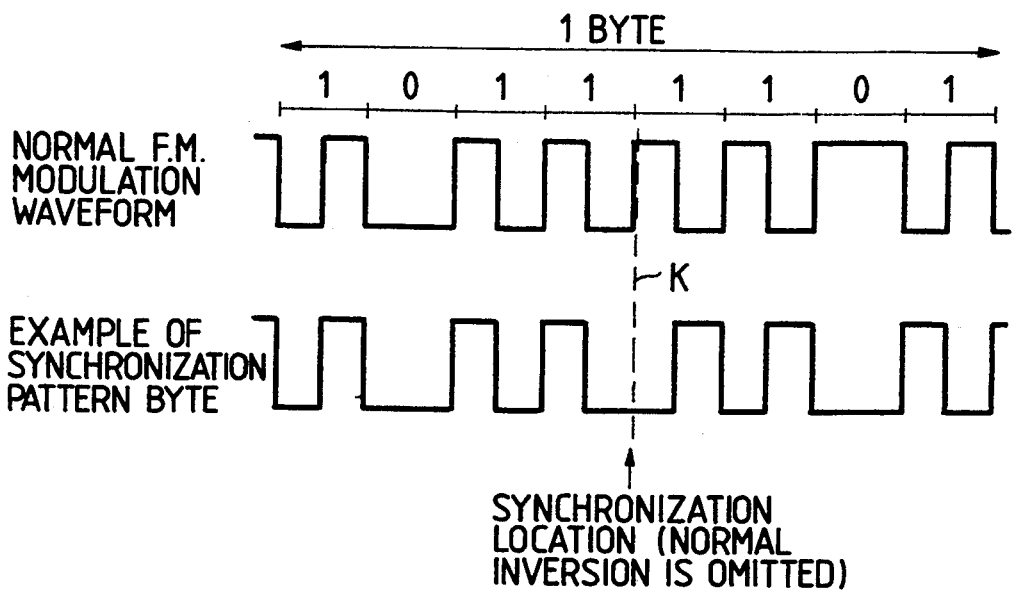
FIG. 6 is a waveform diagram to illustrate a synchronization pattern which is periodically inserted into data recorded by the magnetic tape recording apparatus.
Figure 7:
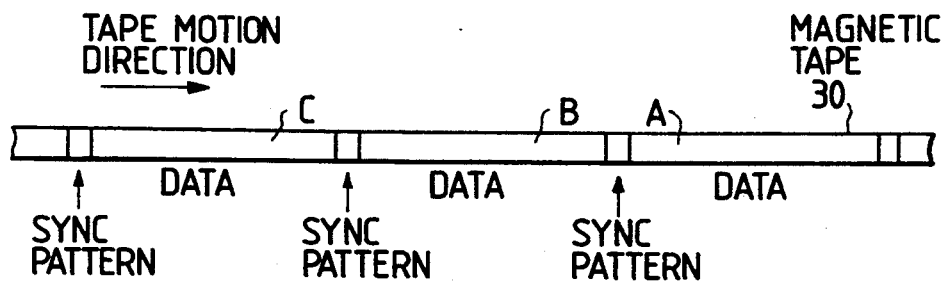
FIG. 7 illustrates the format in which data are recorded on a magnetic tape, with this embodiment.

FIG. 6 is a waveform diagram to illustrate an example of a synchronization pattern which can be utilized. In FIG. 6, the upper diagram shows the waveform of one byte (8 bits) of a normal FM modulation recording signal (i.e. produced from the modulation circuit 17 of FIG. 5). As shown, at that start of each bit period there is a waveform transition between the logic H and L levels. The lower diagram shows the synchronization pattern byte. In this case, there is one bit period (designated as the synchronization location) which should begin with a transition between the H and L levels, but in which that transition is omitted. At the time of playback, a recovered clock signal $CK_B$ is derived which defines the start of each bit period of the playback data stream. Thus it is possible to detect each synchronization location in the playback data stream, and so generate a detection signal at each of the synchronization pattern occurrences. Each synchronization location is positioned at the center of a byte (referred to as a synchronization pattern byte) which occurs once in every 65 bytes of the recording signal. That is illustrated in FIG. 7, which shows the format of the data recorded on the magnetic tape 30. Each of the data blocks A, B, C, corresponding to respective data records, is preceded by a synchronization pattern byte.

Figure 8:
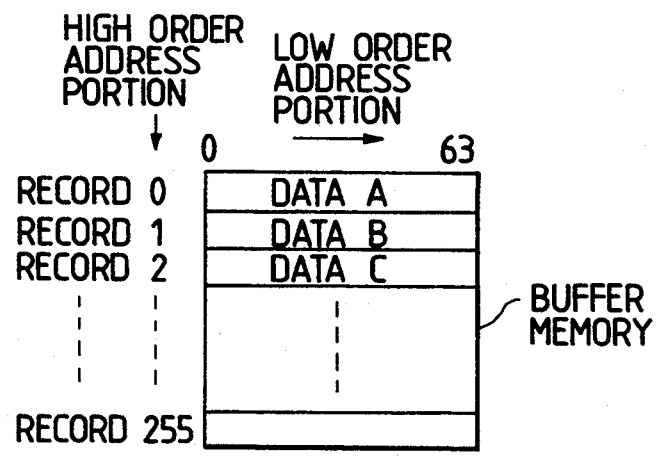
FIG. 8 is a diagram illustrating the arrangement of addresses for storing data in the buffer memory of this embodiment.

FIG. 8 illustrates the relationship between address values generated by the high order address counter 6 and low order address counter 7 respectively and the contents of the buffer memory 2. Data blocks A, B, C, etc., each consisting of 64 8-bit bytes, are stored in successive sections of the buffer memory 2 which are referred to as record 0, record 1, record 2, etc. respectively. During operation in the recording access mode, the respective record numbers are specified successively by sequential count states 0, 1, 2, ... 255 of the high order address counter 6, i.e. by the 8 high order bits produced from the counter 6, while addresses of respective bytes within each record are specified by 64 sequential count states of the outputs Q0 to Q5 of the low order address counter 7 which occur following a synchronization pattern byte, i.e. by the 6 low order bits which are produced from the counter 7. As described above, the low order address counter 7 attains a total of 65 count states, from 0 to 64. Thus the outputs Q0 to Q5 will specify the initial (i.e. 0) address within each record twice in succession, after a new record has been specified by the outputs from the high order address counter 6. However valid write-in of data will only occur at the second occurrence of the 0 address.

At the start of operation in the recording access mode, the high order address counter 6 has been reset in the "0" count state (by means omitted from the drawing, for simplicity), and the low order address counter 7 is also reset to the "0" state so that the data selector 16 inserts a first synchronization pattern byte into the recording data. That is to say, the "0" output from the low order address counter 7 goes to the H logic level for one byte period, so that the data selector 16 inserts an 8-byte synchronization pattern from the synchronization pattern generating circuit 15 into the recording signal. Successive addresses of the first data block A shown in FIGS. 7, 8 are then read out from record 0 of the buffer memory 2, in response to the successive count states 0 to 63 of the outputs Q0 to Q5 of the low order address counter 7, and corresponding read control signals are generated by the read/write control circuit 3 and supplied to the buffer memory 2, so that the 64 bytes of data block A are successively converted into serial form and recorded on the magnetic tape 30. When a count of 63 is reached, the high order address counter 6 is incremented at the start of the next period of clock signal $CK_C$ (i.e. when the "3F" output goes from the H to L level). When a count of 64 is reached, the low order address counter 7 is reset to the all zero count state in the next period of $CK_C$, so that a second synchronization pattern byte is inserted into the recording data by the data selector 16. In addition, the data of address 0 of the next record are read out from the buffer memory 2.

Figure 9:
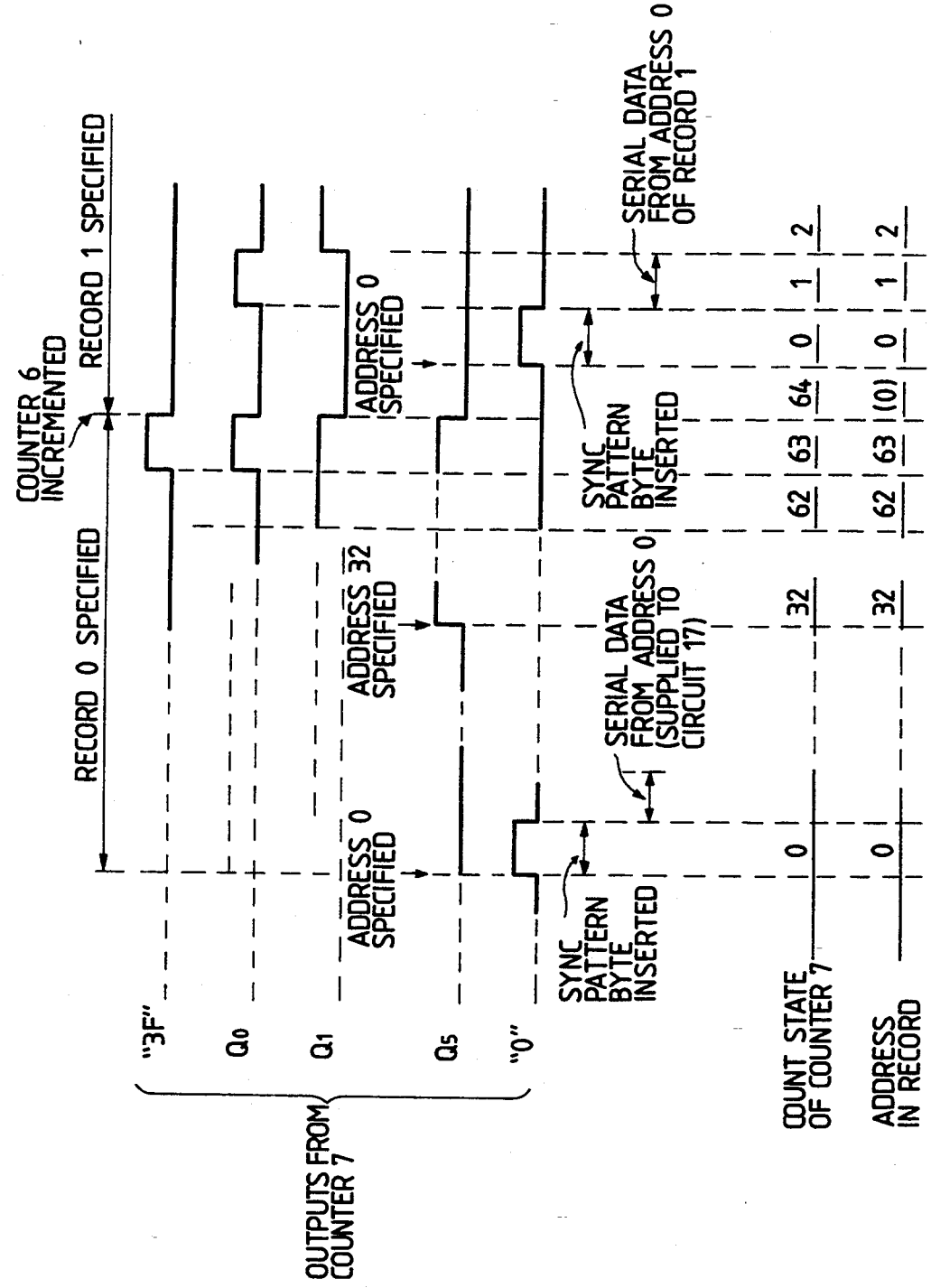
FIG. 9 is a timing diagram for describing address generation and synchronization pattern insertion operations based on count states of an address counter, during recording operation.

The above operation can be more clearly understood from the timing diagram of FIG. 9. As described above the parallel/serial converter 13 introduces a delay of one byte period. Thus for example when the address 0 of record 1 is specified by the states of counters 6 and 7 as shown in FIG. 9, the first bit of the data from address 0 of record 1, read out from the buffer memory 2, is supplied to the synchronization pattern generating circuit 15 from the parallel/serial converter 13 immediately after the end of inserting the synchronization pattern byte. Readout of successive bytes of the data block B stored in record 1 of the buffer memory 2 then begins, as successive low order address values are generated by the low order address counter 7, and the, data block B is thereby recorded on the magnetic tape 30. In a similar manner, the data of the remaining records 2, 3, . . . 255 are sequentially read out and recorded on the magnetic tape 30, each preceded by a synchronization pattern byte as shown in FIG. 7.

When the data thus recorded on the magnetic tape 30 are to be subsequently reproduced, e.g. to be sent to the printer 59 of FIG. 4, the system is set in the playback access mode. Firstly the mechanical components of the magnetic tape recording apparatus are set in the playback condition, and the magnetic tape 30 set in motion, while in addition each of the changeover switch circuits 23, 24, 28 is set to the "b" selection position, so that the recovered clock signal $CK_B$ is supplied to be counted by the 3-bit counter 10, the playback signal is supplied to the head amplifier 19, and the recovered data from the demodulation circuit 21 are supplied to the serial/parallel converter 14. When the synchronization pattern byte preceding the data block A on the magnetic tape 30 is detected by the demodulation circuit 21 in the playback data stream, a corresponding synchronization pattern detection signal is generated and supplied to reset the 3-bit counter 10, which counts successive periods of the recovered clock signal $CK_B$ produced from the demodulation circuit 21. A corresponding byte-synchronized clock signal $CK_C$ is thereby produced from the 3-bit counter 10, to be counted by the low order address counter 7 and also to control the timings of write control signals which are generated in this mode by the read/write control circuit 3 and supplied to the buffer memory 2. Successive bytes of the data block A, recovered from the playback data by the demodulation circuit 21, are then converted to 8-bit bytes by the serial/parallel converter 14 and transferred through the isolating buffer 12 to be written into the buffer memory 2 at respective addresses determined by the 64 successive count states of the low order address counter 7.

Figure 1:
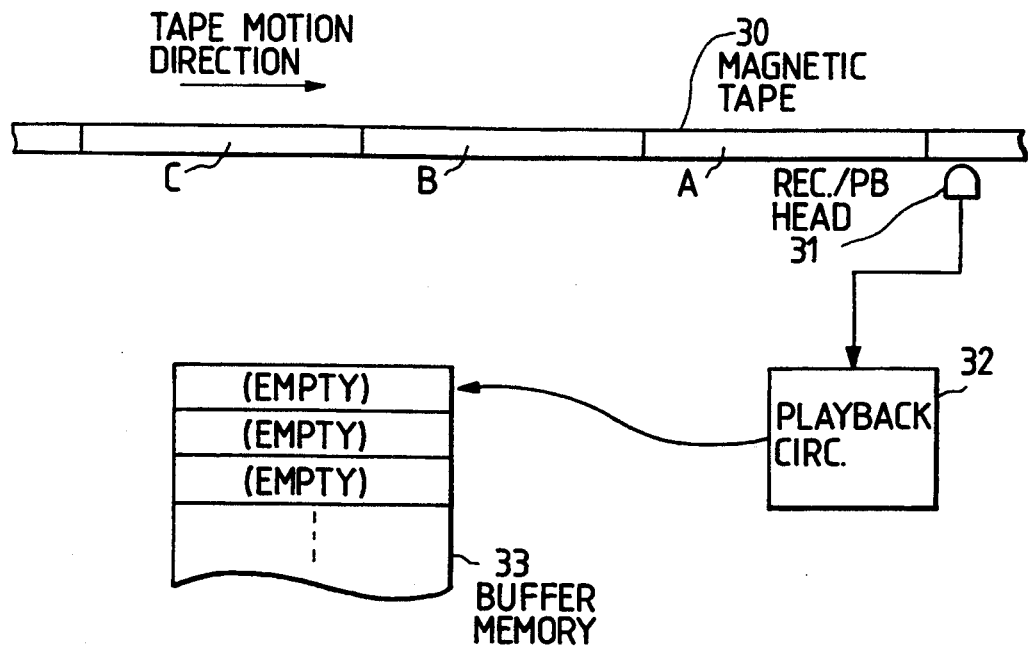
FIGS. 1 and 2 are simple conceptual diagrams for describing the operation of a magnetic tape recording apparatus used in a facsimile apparatus.
Figure 2:
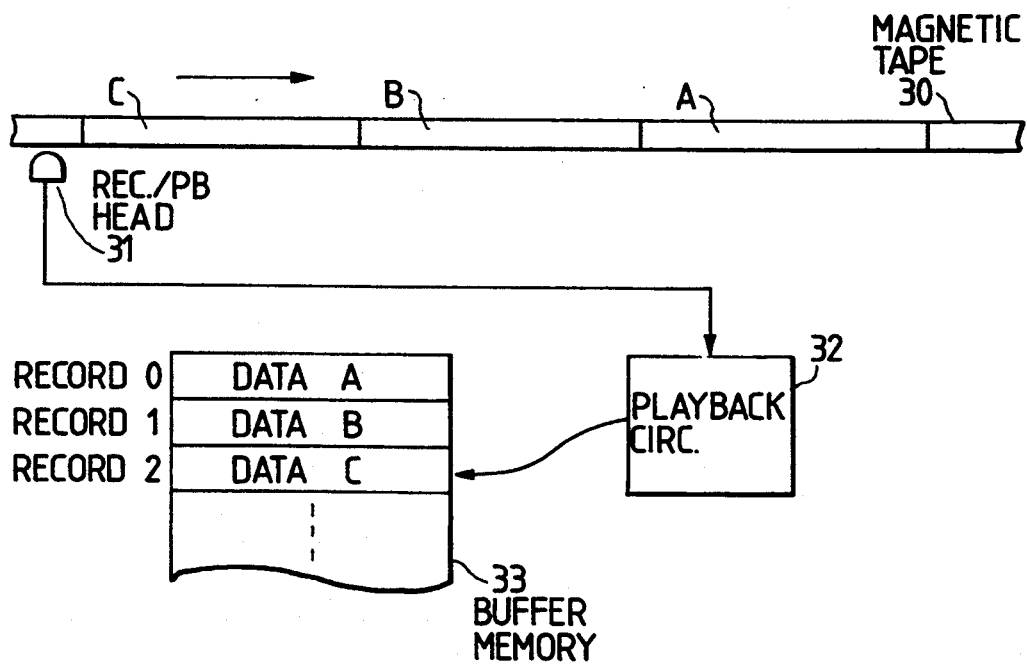
Figure 3:
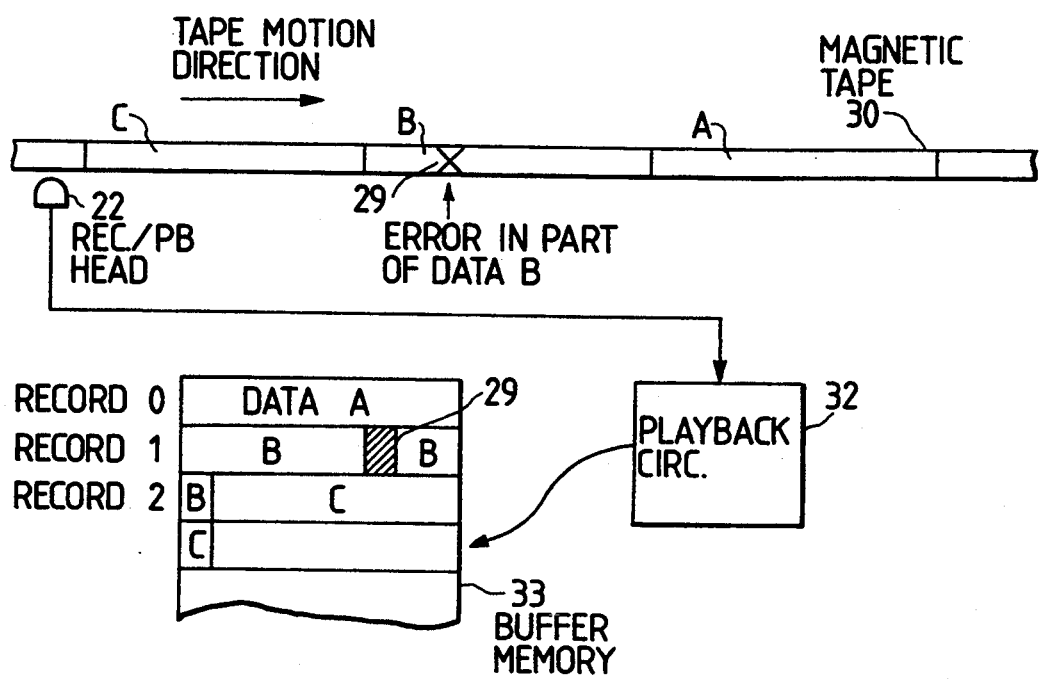
FIG. 3 is a diagram for describing a problem which arises in the prior art due to errors occurring in the playback data obtained from such a magnetic tape recording apparatus.

Assuming that there are no omission or insertion errors in the playback data stream, as described above referring to FIG. 3 and that the high order address counter 6 has been reset beforehand to a count of zero, the synchronization pattern detection signal corresponding to synchronization pattern byte preceding the data block A in the playback data stream, transferred through the OR gate 62, resets the low order address counter 7 to the "0" count state so that the initial address of record 0 is now being specified. The first byte of record A from the playback data, converted to parallel form by the serial/parallel converter 14, is then written into that address of the buffer memory 2. Thereafter as the flow order address counter 7 counts in synchronization wish the clock signal $CK_C$, successive addresses within the record 0 are specified by the low order address counter 7, so that the playback data block A is stored in record 0. When the low order address counter 7 reaches a count of 63, the "3F" output from that counter increments the high order address counter 6 in the succeeding period of clock signal $CK_C$, as described above for the case of recording, so that record 1 is now specified. The count then goes to 64, and in the succeeding period of $CK_C$ the next synchronization pattern detection signal is supplied through the OR gate 66 to the "reset" terminal of the counter 7, so that low order address counter 7 resets to the all zero count state. In addition, the output from AND gate 65 also acts to reset the counter 7, in that same period Address 0 of record 1 is now being specified by the 14 bit address signal generated by the counters 6 and 7, and the first byte of data block B is written into that address. The remaining bytes of data block B are then written into the remaining addresses of record 1, and so on for the remaining data blocks C, D, etc. which are written into the respective records 2, 3, . . . 265.

It will be understood that the address 0 is actually specified twice in succession by state of the outputs Q0 to Q5 of the low order address counter 7 at the start of each record (i.e. when the count states 64 and 0 are respectively attained). However only the data write operation for the second occurrence of address 0 will be effective.

Subsequently, the system is returned to the CPU access mode, and the contents of records 0, 1, 2, etc. of the buffer memory 2 are read out under the control of the CPU 1 to be transferred, e.g. to the printer.

Figure 10:
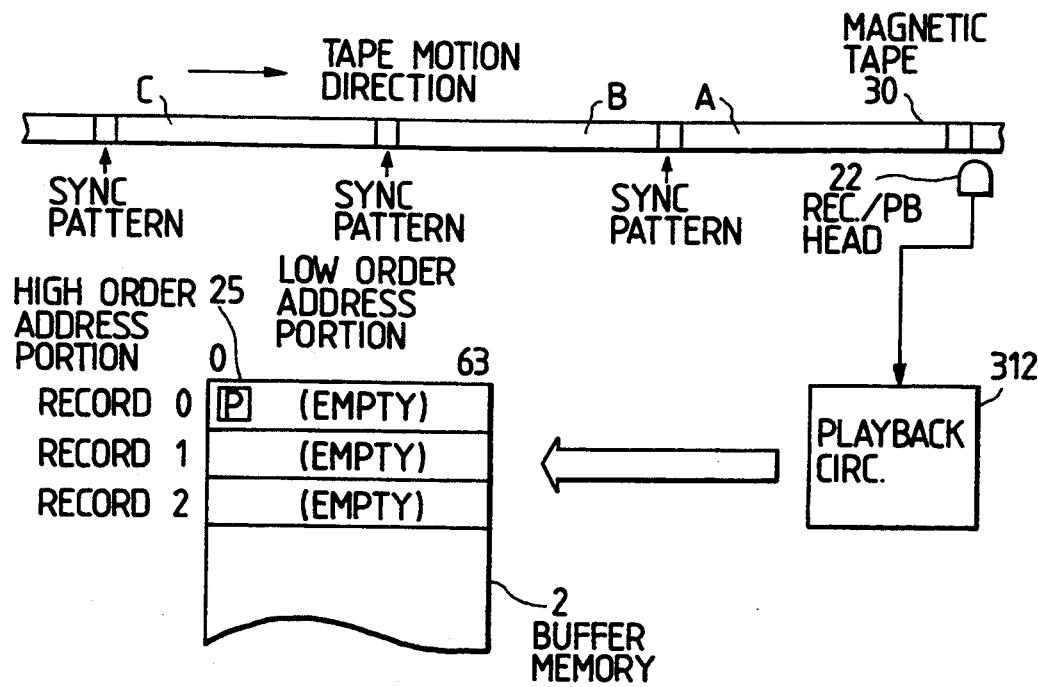
FIG. 10 is a conceptual diagram for illustrating the relationship between data recorded on the magnetic tape and the position of a recording/playback head, prior to playback of data.
Figure 11:
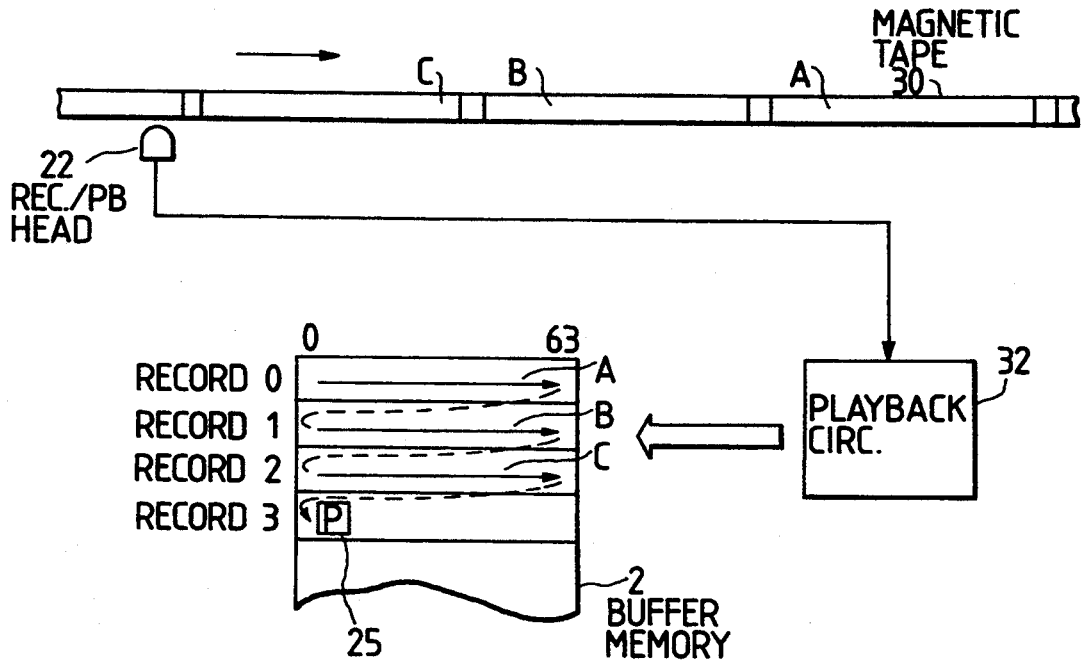
FIG. 11 is a diagram corresponding to FIG. 10, illustrating the condition after playback of the magnetic tape and storing data in the buffer memory.

The above operation during the playback access mode is conceptually illustrated in FIG. 10, which shows the position of the recording/playback head 22 relative to the magnetic tape 30 immediately prior to playback of the data blocks A, B, C recorded on the tape. The playback circuit 32 in FIG. 10 represents the combination of head amplifier 19, read circuit 20, demodulation circuit 21 of FIG. 5. The state of the 14 address bits produced from the high order address counter 6 and low order address counter 7 can be considered as an address pointer, which indicates the specific location in the buffer memory 2 into which the next playback data byte is to be written. At the start of playback of the data block A, the address pointer (designated by numeral 25) specifies the first address of record 0. As data are successively written into the records 0, 1, 2 of the buffer memory 2, the address pointer is moved accordingly, and after write-in of the data block C into record 2 has been completed, the address pointer will specify the first location of record 3, as illustrated in FIG. 11.

Figure 12A:
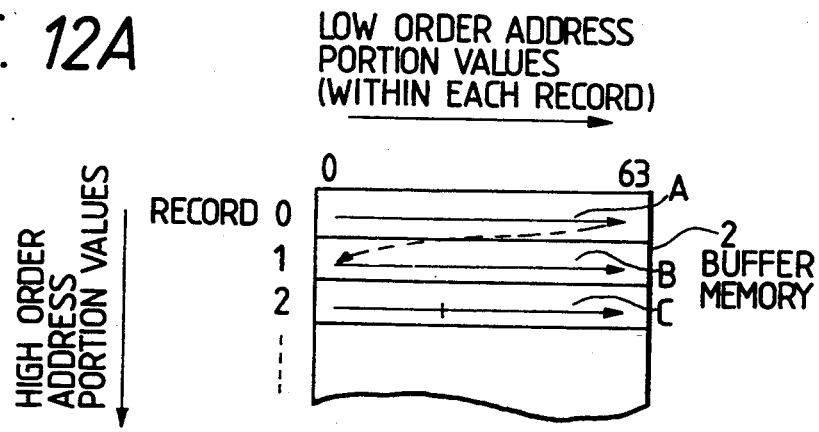
FIGS. 12A, 12B, 12C and 12D are respective diagrams for illustrating the relationships between positions of error occurrence in the playback data and the resultant form in which data that are stored in the buffer memory.
Figure 12B:
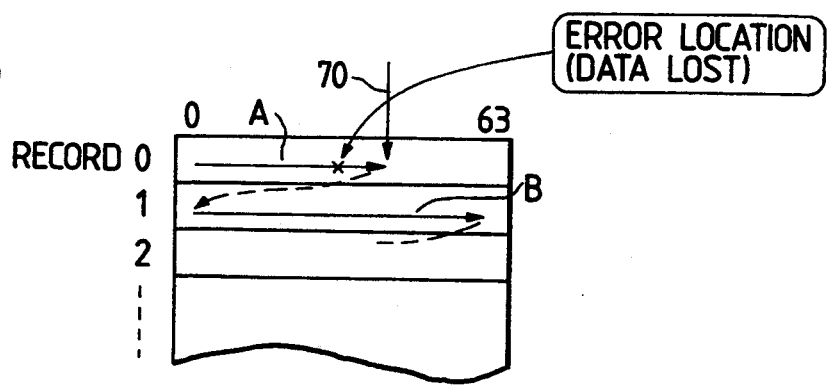

The operation of the circuit of FIG. 5 in the playback access mode in the case of insertion or omission errors being present in the playback data will now be described, referring to FIGS. 12A, 12B, 12C and 12D. FIG. 12A illustrates the operation when there are no errors present in the playback data block A, so that when the end of writing data block A into record 0 is reached, the address pointer moves (as indicated by the broken-line portion) from the last address of record 0 to the first address of record 1, and writing in of data block B then begins. FIG. 12B illustrates the case in which some bytes have been lost from the playback data block A. It is assumed that the number of bytes lost is no greater than 32, which is true for most cases of intermittent loss of playback data due to drop out. In that case, referring to FIG. 5, the synchronization pattern detection signal will be produced from the demodulation circuit 21 while the Q5 output of the low order address counter 7 is at the H logic level (i.e. while the count state of the low order address counter 7 is greater than 32 but less than 64). Thus an H level output will be produced from the AND gate 9 in synchronization with that synchronization pattern detection signal, so that the high order address counter 6 will be incremented. In addition, the synchronization pattern detection signal (supplied through the OR gate 66) will reset the low order address counter 7 to a count of zero, so that the address pointer will be moved to the initial address of record 1, as indicated by the broken-line portion. The arrow 70 indicates the point at which the synchronization pattern detection signal is generated. As a result, the effects of the data omission error in the data block A will not be propogated to the contents of record 1 or any subsequent records, so that the respective bytes of data block B, data block C, etc. will be written into the correct locations in records 1, 2, etc.

Figure 12C:
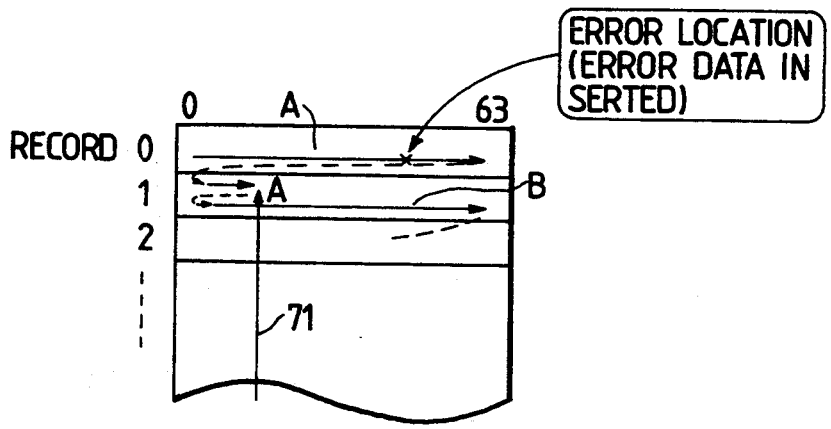

FIG. 12C illustrates a condition (as described above referring to FIG. 3) in which the length of the data block A has been increased as a result of insertion of spurious additional bits, e.g. due to the effects of electrical noise in the recording and playback operations. As a result, when record 0 has been filled by 64 bytes of data written therein, the low order address counter 7 will be reset to the "0" count state by the Q6 output of that counter transferred through AND gate 65 and OR gate 66, while the address counter 6 is incremented by the "3F" output from counter 7. Thus the address pointer will begin to designate successive locations in record 1, into which a final part of the erroneously expanded data block A is written. However when the synchronization pattern detection signal is generated at the end of the data block A (i.e. at the point indicated by the arrow 71), the low order address counter 7 is reset to the "0" count state, i.e. the address pointer is returned to the start of the record 1, as indicated by the broken-line portion. Hence, the portion of data block A which had been written into record 1 is effectively erased, by being overwritten by the data block B, i.e. the data block B is written into the correct 64 locations extending from the start to end of the record 1. Thus the effects of the data insertion error, whereby the length of data block A was increased beyond its correct length, are not propogated beyond the record 0.

It can thus be understood that the present invention effectively overcomes the problem of the prior art described above, whereby the effects of an error in the playback data can propogate through all of the records in the buffer memory into which playback data following the error portion are written. The problem is overcome both for the case of an error whereby playback data have been lost, and an error whereby spurious data have been inserted into the playback data.

Thus with the above embodiment during operation in the playback mode, if a synchronization pattern detection signal is produced at a point during generation of addresses of a current record which is within the first half of the addresses constituting that record (i.e. within the address range 0 to 31), then the initial address of the current record will be immediately specified, for writing into the buffer memory the data block which succeeds that synchronization pattern detection signal. However if a synchronization pattern detection signal is produced at a point during generation of addresses of a current record which is within the second half of the addresses constituting that record (i.e. within the address range 32 to 63) then the initial address of the succeeding record will be immediately specified, for writing into the buffer memory the data block which succeeds that synchronization pattern detection signal.

Figure 12D:
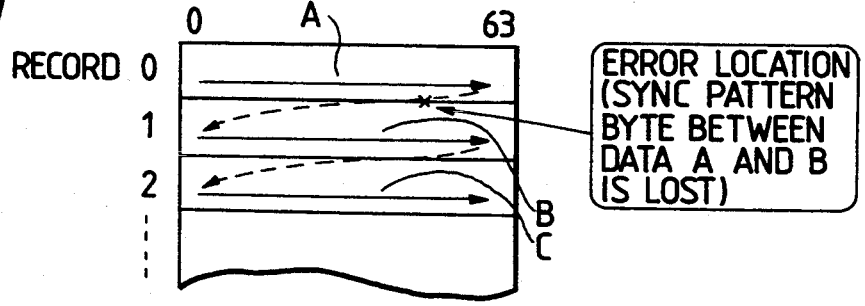

FIG. 12D illustrates the case in which only a synchronization pattern byte has been lost from the playback data, i.e. the synchronization pattern byte which should occur between the data block A and B. In that case, at the completion of writing data block A into the record 0, the Q6 output of the low order address counter 7 goes to the logic H level, thereby acting through the AND gate 65 and OR gate 66 to reset the low order address counter 7 to the "0" count state, while in addition the high order address counter 6 is incremented by the "3F" output. The address pointer is thereby set to the first address of record 1. Thus, the occasional failure to detect a synchronization pattern byte in the playback signal will have no adverse effect upon the operation.

It will be understood that various alternative configurations could be envisaged for implementing the present invention, other than that of the embodiment of FIG. 5, and that various modifications to the circuit of FIG. 5 could be envisaged. For example the embodiment has been described assuming that during operation in the recording access mode, the data selector 16 is controlled such as to insert a synchronization pattern byte each time the count state of the low order address counter 7 reaches zero, with subsequent count states of the counter 7 specifying respective addresses within a record. However it would be possible to envisage various other ways of controlling insertion of the synchronization pattern in accordance with the count states of counter 7.

The invention has been described in the above for the case of an embodiment in which an address counter circuit is used both for writing data into and reading data out from the buffer memory, and in which data to be recorded on the magnetic tape are read out from a buffer memory as successive blocks, which are subsequently written back into the same sets of addresses of the buffer memory at the time of playback. However these are not essential features of the invention. That is to say, it would be possible to divide a continuous stream of data (produced by read-out from a memory or from some other source, and not defined as units of blocks), into units of blocks within the recording signal by the action of periodically inserting the synchronization signals into the recording signal. At the time of playback, the recovered data blocks are written into respective fixed-length sets of addresses (i.e. records) of the buffer memory, using address values generated by an address generating circuit (such as the combination of address counters 6, 7 in the above embodiment) which specify the buffer memory record into which each data block is to written and the address within each record into which each byte of a block is to be written. In the same way as for the preferred embodiment described above, each time e synchronization signal is detected in the playback data stream, the address generating circuit is reset to a condition in which it specifies the start of a record (i.e. either the current record or the succeeding record, depending upon the position in the current data block at which the synchronization signal is detected). The data block following each synchronization signal in the playback data stream is thereby written into that record, beginning from the start of the record.

It will be apparent that such an implementation of the present invention would provide all of the advantages described above for the preferred embodiment, whereby the effects of any errors in the playback data will be substantially entirely limited to within one block and will not propogate through the remainder of the data.

What is claimed is:

1. In a facsimile apparatus including facsimile means for receiving and transmitting facsimiles, digital data storage means comprising:

a buffer memory;

a magnetic tape recording apparatus;

a control circuit operable for selectively setting said magnetic tape recording apparatus in a recording mode of operation for recording image data and in a playback mode of operation for playback of said data;

recording means functioning in said recording mode to convert said data to a recording signal and for recording said data, as said recording signal, on a magnetic tape;

synchronization signal generating an insertion means for periodically inserting synchronization signals into said data recorded on said magnetic tape, at respective positions preceding successive fixed-length blocks of said data;

playback means functioning in said playback mode to recover said data blocks from said magnetic tape, and to detect said synchronization signals; and address generating means functioning in said playback mode to specify addresses for storing said data blocks from said playback means in respective sequential records of said buffer memory, said address generating means including means for generating an initial address of one of said records in response to detection of each of said synchronization signals.

2. A facsimile apparatus according to claim 1, wherein said recording signal is a modulated signal derived from said data, and wherein said synchronization signal generating and insertion means functions to periodically insert said synchronization signals into said recording signal.

3. A facsimile apparatus according to claim 1, wherein said address generating means is configured to be selectively reset to generate an initial address of a current one of said records and to generate an initial address of a succeeding one of said records in accordance with a time at which said synchronization signal is detected during generation of addresses of said current record.

4. A facsimile apparatus according to claim 3, wherein said address generating means is configured to be reset to generate an initial address of a current one of said records if one of said synchronization signals is detected during generation of addresses within an initial half of said current record, and is reset to generate an initial address of a succeeding one of said records if said synchronization signal is detected during generation of addresses within a second half of said current record.

5. A facsimile apparatus according to claim 1, wherein said playback means comprises means for generating a recovered clock signal which is synchronized with said data recovered by the playback means, and wherein said address generating means comprises a low order address counter functioning in said playback mode to count in synchronism with said recovered clock signal, for producing count values specifying successive address positions within each of said records, and a high order address counter coupled to be periodically incremented by an output signal from said low order address counter, for producing count values specifying successive ones of said records.

6. A facsimile apparatus according to claim 5, wherein said low order address counter is configured to have a total number of count states which is greater by one than a number of addresses in each of said records, and wherein said low order address counter includes means for decoding one of said count states during said recording mode, to produce a designation signal for controlling said synchronization signal generation and insertion means to periodically insert said synchronization signals into said recording signal.

7. In a facsimile apparatus including facsimile means for receiving and transmitting facsimiles, digital data storage means comprising:

a buffer memory;

a magnetic tape recording apparatus;

a control circuit operable for selectively setting said magnetic tape recording apparatus and buffer memory in a recording mode of operation for reading out data from said buffer memory and recording said data, and in a playback mode of operation for playback of said data and writing said data back into said buffer memory;

address generating means functioning in said recording mode to generate successive addresses for reading data from said buffer memory, as successive blocks of data from respective records, and to generate respective synchronization designation signals immediately prior to initial addresses of said records;

recording means functioning in said recording mode to convert said data to a recording signal and to record said data, as said recording signal, on a magnetic tape;

synchronization signal generation and insertion means responsive to said synchronization designation signals in said recording mode for inserting synchronization signals into said data recorded on said magnetic tape at respective positions preceding each of said data blocks;

playback means functioning in said playback mode to successively recover said data blocks from said magnetic tape, and to detect said synchronization signals;

said address generating means operating in said playback mode to generate addresses for storing said data blocks from said playback means in said records of said buffer memory, including means for generating an initial address of one of said records in response to detection of each of said synchronization signals.

8. A facsimile apparatus according to claim 7, wherein said recording signal is a modulated signal derived from said data, and wherein said synchronization signal generating and insertion means functions to periodically insert said synchronization signals into said recording signal.

9. A facsimile apparatus according to claim 7, wherein said address generating means is configured to be selectively reset to generate an initial address of a current one of said records and to generate an initial address of a succeeding one of said records in accordance with a time at which said synchronization signal is detected during generation of addresses of said current record.

10. A facsimile apparatus according to claim 9, wherein said address generating means is configured to be reset to generate an initial address of a current one of said records if one of said synchronization signals is detected during generation of addresses within an initial half of said current record, and to be reset to generate an initial address of a succeeding one of said records if said synchronization signal is detected during generation of addresses within a second half of said current record.

11. A facsimile apparatus according to claim 7, wherein said address generating means comprises a high order address counter, a low order address counter and a source of a fixed frequency clock signal;

wherein during said recording mode said low order address counter functions to count in synchronism with said fixed frequency clock signal, for producing count values specifying successive address positions within each of said records, and said high order address counter is periodically incremented by an output signal from said low order address counter, for producing count values specifying successive ones of said records; and wherein during said playback mode said low order address counter functions to count in synchronism with said recovered clock signal, for producing count values specifying successive address positions within each of said records, and said high order address counter is periodically incremented by an output signal from said low order address counter, for producing count values specifying successive ones of said records.

12. A facsimile apparatus according to claim 11, wherein said low order address counter is configured to have a total number of count states which is greater by one than a number of addresses in each of said records, and wherein said low order address counter includes means for periodically deriving count state output signals corresponding to one of said count states, said count state output signals constituting designation signals for controlling said synchronization signal generation and insertion means.

13. In a facsimile apparatus including facsimile means for receiving and transmitting facsimiles and digital data storage means for storage of data received by the facsimile means, a buffer memory; a magnetic tape recording apparatus; a control circuit operable for selectively setting said magnetic tape recording apparatus in a recording mode of operation for recording image data and in a playback mode of operation for playback of said data; and recording means functioning in said recording mode to convert said data to a recording signal and for recording said data, as said recording signal, on a magnetic tape; the improvement comprising:

error limiting means for limiting propagation of errors caused by data drop out and by added data noise bits in a received data block to only the received data block having an error, said error limiting means including:

synchronization signal generating an insertion means for periodically inserting synchronization signals into said data recorded on said magnetic tape, at respective positions preceding successive fixed-length blocks of said data;

playback means functioning in said playback mode to recover said data blocks from said magnetic tape, and to detect said synchronization signals; and address generating means operating in said playback mode for specifying addresses for storing said data blocks from said playback means in respective sequential records of said buffer memory, said address generating means including means responsive to detection of each of said syhchronization signals by generating an initial address of one of said records in response to each of said synchronization signals.

* * * * *